(12) United States Patent
Sekine et al.

(10) Patent No.: US 6,891,577 B2
(45) Date of Patent: May 10, 2005

(54) PROJECTION DISPLAY APPARATUS

(75) Inventors: Atsushi Sekine, Kasukabe (JP); Tetsuo Hattori, Yokohama (JP)

(73) Assignee: Nikon Corporation, Tokyo (JP)

( * ) Notice: Subject to any disclaimer, the term of this patent is extended or adjusted under 35 U.S.C. 154(b) by 3 days.

(21) Appl. No.: 10/418,155

(22) Filed: Apr. 18, 2003

(65) Prior Publication Data

US 2003/0202129 A1 Oct. 30, 2003

(30) Foreign Application Priority Data

Apr. 26, 2002 (JP) .................................. 2002-126562
Sep. 27, 2002 (JP) .................................. 2002-282204

(51) Int. Cl.$^7$ .............................................. G02F 1/1335
(52) U.S. Cl. ........................ 349/8; 349/5; 359/322; 353/20; 353/33
(58) Field of Search ................... 349/5, 8; 359/322; 353/33, 20

(56) References Cited

U.S. PATENT DOCUMENTS 5,268,775 A 12/1993 Zeidler ........................ 359/40
5,844,637 A * 12/1998 Katsumata .................... 349/8
6,010,221 A * 1/2000 Maki et al. ................... 353/33
2001/0000678 A1 * 5/2001 Hattori et al. ................ 353/20

FOREIGN PATENT DOCUMENTS

JP          09-251150          9/1997
JP          2000-330196        11/2000

* cited by examiner

*Primary Examiner*—Huyen Ngo
(74) *Attorney, Agent, or Firm*—Miles & Stockbridge P.C.

(57) ABSTRACT

In a projection display apparatus that analyzes to pick up lights emitted from a plurality of the reflective light valves, color-composes the analyzed lights and projects the color-composed light, a dichroic film is disposed in at least one of optical paths of the respective color lights between the polarizing beam splitters and the dichroic prism. The dichroic film reflects such a component of a color light derived from the composite light incident on the projection optical system that has been reflected by a surface of a lens element constituting the projection optical system and incident on the dichroic prism after passing through a quarter wave phase plate and reflected or transmitted by the dichroic film within the dichroic prism to travel along the optical path of the color light in the reverse direction, thereby deflecting the color light component out of the optical path.

17 Claims, 10 Drawing Sheets

PROJECTION DISPLAY APPARATUS

This application claims the benefit of Japanese Patent applications No. 2002-126562 and No. 2002-282204 which are hereby incorporated by reference.

BACKGROUND OF THE INVENTION

Field of the Invention

The present invention relates to a projection display apparatus that analyzes to pick up lights emitted from a plurality of reflective light valves, color-composes the analyzed lights, and projects the composite light (or the color-composed light) with a projecting optical system. In particular, the present invention relates to a method for preventing a ghost light from being produced in the projected light.

In the following, a conventional projection display apparatus will be described with reference to a diagrammatic illustration of the apparatus presented as FIG. 14.

Source light emitted from a light source 101 composed of a lamp and a concave mirror comprises a substantially parallel light flux of randomly polarized light. The source light is incident on a polarization converting device 102 so as to be converted into a S-polarized light in which the direction of oscillation of the electric vector (which will be hereinafter referred to as the polarization direction) is perpendicular to the plane of the drawing sheet. The light travels further and enters a cross dichroic mirror 103 in which a dichroic mirror 103B having a property of reflecting B (i.e. blue) light and a dichroic mirror 103RG having a property of reflecting R (i.e. red) and G (i.e. green) light are arranged orthogonal to each other to form an X-shape. The light incident on the dichroic mirror 103 is color-separated into a B light and a mixed light including R light and G light, which travel toward directions opposite to each other.

The B light thus color-separated is reflected by a deflecting mirror 104 to change its direction of travel and incident on a polarizing beam splitter 107B provided for the B light. On the other hand, the separated mixed light including R light and G light is reflected by a deflecting mirror 105 to change its direction of travel to enter a dichroic mirror 106 that has a property of reflecting G light, so as to be color-separated into G light that is reflected for further traveling and R light that is transmitted for further traveling. The R light and the G light thus separated are incident on a polarizing beam splitter 107R and a polarizing beam splitter 107G respectively provided for the respective colors.

Since All of the lights of the respective colors incident on the polarizing beam splitters for the respective colors are S-polarized, they are reflected by the polarizing splitting surfaces that are arranged substantially perpendicular to the plane of the drawing sheet as will be seen from FIG. 14 to travel further and enter respectively a reflective light valve 108B, a reflective light valve 108R and a reflective light valve 108G provided for the respective colors.

The lights of the respective colors incident on the light valves for the respective colors are subjected to modulation by color signals and reflected to be emitted from them. Then, they are incident on the polarizing beam splitter for the respective colors again, and the modulated lights (which are P-polarized lights) transmitted by the polarizing splitting surfaces are analyzed to be picked up. The non-modulated lights (which are S-polarized lights) are reflected by the polarizing splitting surfaces and thrown away in directions toward the light source.

Among the analyzed lights of the respective colors, the B light and the R light passes through half wave phase plates 109 and 110 respectively so as to be converted into S-polarized lights and enter a cross dichroic prism 111, which constitutes a color composing optical system, from different opposite incident surfaces. The analyzed G light is made incident on the dichroic prism with the P-polarized state unchanged.

The cross dichroic prism 111 that constitutes the color composing optical system is a composite prism in which a dichroic film 111R having a property of reflecting R light and a dichroic film B having a property of reflecting B light are arranged orthogonal to each other to form an X-shape. The B light incident on this prism 111 is reflected by the B light reflective dichroic film 111B, the R light incident on the prism 111 is reflected by the R light reflective dichroic film 111R, and the G light incident on the prism 111 is transmitted by the B light reflective dichroic film 111B and the R light reflective dichroic film 111R. Thus, color composing or color synthesis is attained, and the composite light is emergent from the cross dichroic prism 111.

The reason why the R and B lights are made S-polarized and the G light is made P-polarized before made incident on the cross dichroic prism 111 is to reduce loss of the light quantities of the incident lights that contribute to the composite light by utilizing optical characteristics of the dichroic films 111R and 111B so as to enhance brightness of projected images.

The RGB composite light emergent from the cross dichroic prism 111 passes through a quarter wave phase plate 112 so as to be converted into a circularly polarized light. The light is then made incident on a projection optical system 113 and projected onto a screen (which is not shown in the drawing).

The quarter wave phase plate 112 disposed between the cross dichroic prism 111 and the projection optical system 113 is provided for the purpose of preventing light reflected by lenses that constitute the projection optical system from being projected as a ghost light, as described in Japanese Patent Application Laid-Open No. 9-251150, which is owned by the assignee of the present patent application. Specifically, such a portion of a light to be projected incident on the projection optical system 113 that has been reflected by surfaces of a plurality of lens members that constitute the projection optical system is returned back to the quarter wave phase plate and transmitted by it. Thus, the R light component and the B light component in the returned light are converted from circularly polarized lights into P-polarized lights and the G light component is converted from a circularly polarized light into an S-polarized light. The light thus incident on the cross dichroic prism 111 is color-separated by that prism into the respective polarized lights and incident on the polarizing beam splitters for the respective colors, wherein the G light preserves its S-polarized state while the R light and the B light are converted into S-polarized lights by the half wave phase plates 110 and 109. The polarized lights incident on the polarizing beam splitters for the respective colors are reflected by the polarizing splitting surfaces and thrown away along the optical axes.

Reference is made here to Japanese Patent Application Laid-Open No. 2000-330196 as a patent document which discloses a projection display apparatus of the above-described type.

However, it was found that in the conventional projection display apparatus as described above, a ghost light is still generated even if a quarter wave phase plate for preventing projection of ghost lights is provided between a dichroic prism and a projection optical system.

SUMMARY OF THE INVENTION

An object of the present invention is to prevent ghost lights as described above from being generated.

A projection display apparatus according to the present invention that attains the above object comprises:

- reflective light valves provided for a first color light and a second color light respectively;
- polarizing beam splitters provided for the respective color lights which analyze to pick up the respective color lights that have been modulated and emitted from said reflective light valves;
- a dichroic prism on which the analyzed lights emergent from said polarizing beam splitters for the respective color lights are made incident from different surfaces respectively, said dichroic prism having a dichroic film having a property of reflecting the first color light, wherein the first color light is reflected by said dichroic film and the second light is transmitted by said dichroic film, so that said first color light and said second color light are color-composed and a composite light is emitted from the dichroic prism;
- a quarter wave phase plate that converts said composite light into a circularly polarized light;
- a projection optical system that projects said composite light that have been converted into the circularly polarized light; and
- a dichroic film disposed in at least one of optical paths of the respective color lights between polarizing splitting surfaces of said polarizing beam splitters for the respective color lights and said dichroic prism, which reflects such a component of the second color light derived from said composite light incident on said projection optical system that has been reflected by a surface of a lens element constituting said projection optical system and incident on said dichroic prism after passing through said quarter wave phase plate and reflected by said dichroic film within said dichroic prism to travel along the optical path of the first color light in the reverse direction, or such a component of the first color light derived from said composite light incident on said projection optical system that has been reflected by a surface of a lens element constituting said projection optical system and incident on said dichroic prism after passing through said quarter wave phase plate and transmitted by said dichroic film within said dichroic prism to travel along the optical path of the second color light in the reverse direction, so as to deflect said second color light component or said first color light component out of said optical path of the first color light or out of said optical path of the second color light.

In the projection display apparatus according to the present invention, it is preferable that the directions of oscillation of the electric vectors of the first color light and the second color light that are incident on said dichroic prism after having been analyzed by said polarizing beam splitters, are orthogonal to each other.

Furthermore, in the projection display apparatus according to the present invention, it is preferable that the dichroic film provided in at least one of said optical paths of the respective color lights between the polarizing splitting surfaces of said polarizing beam splitters for the respective color lights and said dichroic prism be disposed in the optical path between said polarizing beam splitter and said dichroic prism.

Still further, in the projection display apparatus according to the present invention, it is preferable that the dichroic film provided in at least one of said optical paths of the respective color lights between the polarizing splitting surfaces of said polarizing beam splitters for the respective color lights and said dichroic prism be disposed within said polarizing beam splitter in such a way as to be opposed to said polarizing splitting surface.

A projection display apparatus according to another aspect of the present invention comprises:

- reflective light valves provided for R (red) light, G (green) light and B (blue) light respectively;
- polarizing beam splitters provided for the respective color lights which analyze to pick up the respective color lights that have been modulated and emitted from said reflective light valves for the respective colors;
- a cross dichroic prism on which the analyzed lights emergent from said polarizing beam splitters for the respective color lights are made incident from different surfaces respectively, said cross dichroic prism having an R light reflective dichroic film having a property of reflecting the R light and a B light reflective dichroic film having a property of reflecting the B light that are orthogonal to each other, wherein the R light is reflected by said R light reflective dichroic film, the B light is reflected by said B light reflective dichroic film, and the G light is transmitted by said R light reflective dichroic film and said B light reflective dichroic film, so that the color lights are color-composed and a composite light is emitted from the cross dichroic prism;
- a quarter wave phase plate that converts said composite light into a circularly polarized light; and
- a projection optical system that projects said composite light that have been converted into the circularly polarized light;

wherein, the R light and the B light that are emergent from said polarizing beam splitters for the respective color lights and incident on said cross dichroic prism are S-polarized with respect to said R light reflective dichroic film and said B light reflective dichroic film of said cross dichroic prism, and the G light that is emergent from said polarizing beam splitter and incident on said cross dichroic prism is P-polarized with respect to said R light reflective dichroic film and said B light reflective dichroic film; and the apparatus further comprises a dichroic film disposed in at least one of optical paths of the respective color lights between polarizing splitting surfaces of said polarizing beam splitters for the respective color lights and said cross dichroic prism, which reflects such a component of the R light or the B light derived from said composite light incident on said projection optical system that has been reflected by a surface of a lens element constituting said projection optical system and incident on said cross dichroic prism after passing through said quarter wave phase plate and incident on said R light reflective dichroic film and said B light reflective dichroic film and transmitted by said R light reflective dichroic film and said B light reflective dichroic film to travel along the optical path of the G light in the reverse direction, or such a component of the G light derived from said composite light incident on said projection optical system that has been reflected by a surface of a lens element constituting said projection optical system and incident on said cross dichroic prism after passing through said quarter wave phase plate and reflected by at least one of said two dichroic films to travel along the optical path of said R light or said B light in the reverse direction, so as to deflect said R light component, said B light component or said G light component out of the optical path.

In the projection display apparatus according to the another aspect of the present invention, it is preferable that the dichroic film provided in at least one of said optical paths of the respective color lights between the polarizing splitting surfaces of said polarizing beam splitters for the respective color lights and said cross dichroic prism be disposed in the optical path between said polarizing beam splitter and said cross dichroic prism.

Furthermore, in the projection display apparatus according to the another aspect of the present invention, it is preferable that the dichroic film provided in at least one of said optical paths of the respective color lights between the polarizing splitting surfaces of said polarizing beam splitters for the respective color lights and said cross dichroic prism be disposed within said polarizing beam splitter in such a way as to be opposed to said polarizing splitting surface.

A projection display apparatus according to the third aspect of the present invention comprises:

a reflective light valve provided for R (red) light;

a polarizing beam splitter which analyzes to pick up the light that has been modulated and emitted from said reflective light valve for R light;

a dichroic prism on which the analyzed light emergent from said polarizing beam splitter is made incident, said dichroic prism having an R light reflective dichroic film having a property of reflecting R light, wherein the R light is reflected by said R light reflective dichroic film and emergent from the dichroic prism;

a quarter wave phase plate that converts the light emergent from said dichroic prism into a circularly polarized light;

a projection optical system that projects said light that have been converted into the circularly polarized light;

wherein, the R light emergent from said polarizing beam splitter and incident on said dichroic prism is S-polarized with respect to said R light reflective dichroic film; and said R light reflective dichroic film has a reflection/transmission boundary wavelength at the boundary of R light and G (green) light for P-polarized light that has an oscillation direction orthogonal to the oscillation direction of said S-polarized light.

DESCRIPTION OF THE PREFERRED EMBODIMENTS

Investigation on Causes of Ghost Light

The inventor have investigated the conventional projection display apparatus as described in the Related Background Art section, and found causes of ghost lights, which will be described in the following.

Figure 14:
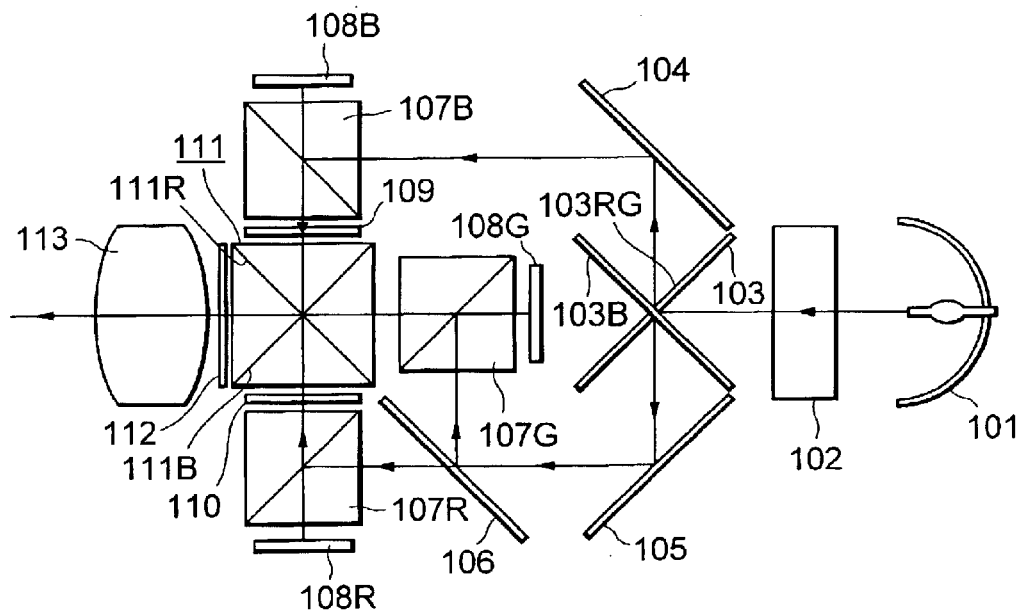
FIG. 14 is a diagram illustrating a conventional projection display apparatus.
Figure 15:
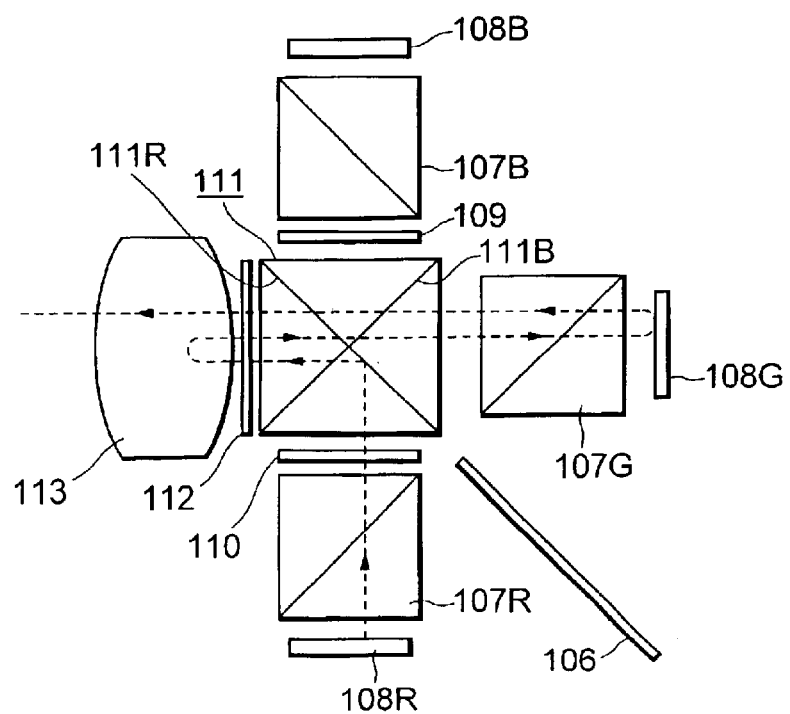
FIG. 15 is a diagram used for illustrating how a ghost light is produced in the conventional projection display apparatus.

First, a description will be made of how a ghost image of R light is generated, with reference to FIG. 15. In FIG. 15, illustrations of a light source, polarization converting device and a portion of a color separating optical system that were referred to in the forgoing description in connection with FIG. 14 are omitted, and there is illustrated only a dichroic mirror 106 that reflects G light, polarizing beam splitter 107R, 107G and 107B for the respective colors, light valves 108R, 108G and 108B for the respective colors, a half wave phase plates 109 and 110, a color composing optical system 111, a quarter wave phase plate 112 and a projection optical system 113. A modulated light (i.e. P-polarized light) included in the R light emergent from the light valve 108R for R light is incident on the polarizing beam splitter 107R, transmitted by its polarizing splitting surface, and emergent from the polarizing beam splitter 107R. That light is then converted into an S-polarized light by the half wave phase plate 110 and incident on the cross dichroic prism 111. The S-polarized light incident on the cross dichroic prism is reflected by an R light reflective R light reflective dichroic film 111R in the cross dichroic prism and emergent from it, and converted by the quarter wave phase plate 112 into a circularly polarized light and incident on the projection optical system 113. Such a portion of the R light incident on the projection optical system that has been reflected by a surface(s) of a lens member(s) constituting the projection optical system is returned to the quarter wave phase plate 112 and transmitted by it, whereby the reflected light is converted into a P-polarized light. That light is then incident on the dichroic prism 111 again.

Figure 3A:
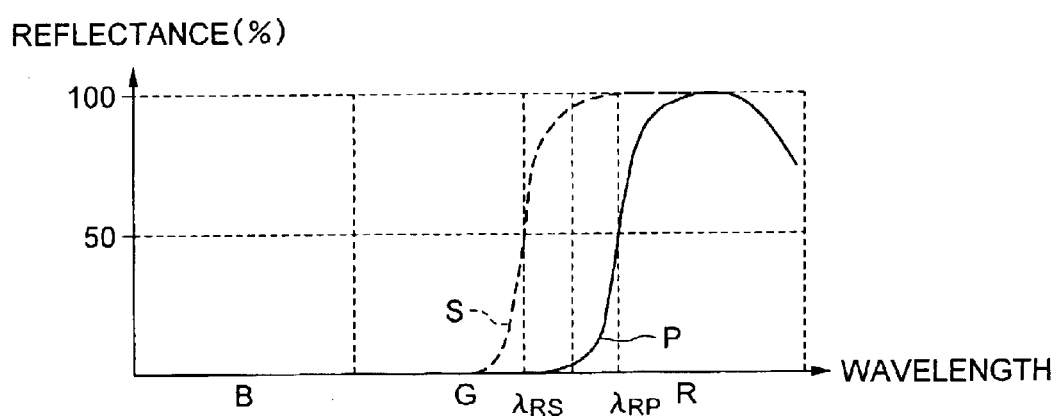
FIGS. 3A and 3B are graphs showing optical characteristics of two dichroic films respectively within a cross dichroic prism that serves as a color composing optical system in the projection display apparatus according to the first embodiment of the present invention.
Figure 3B:
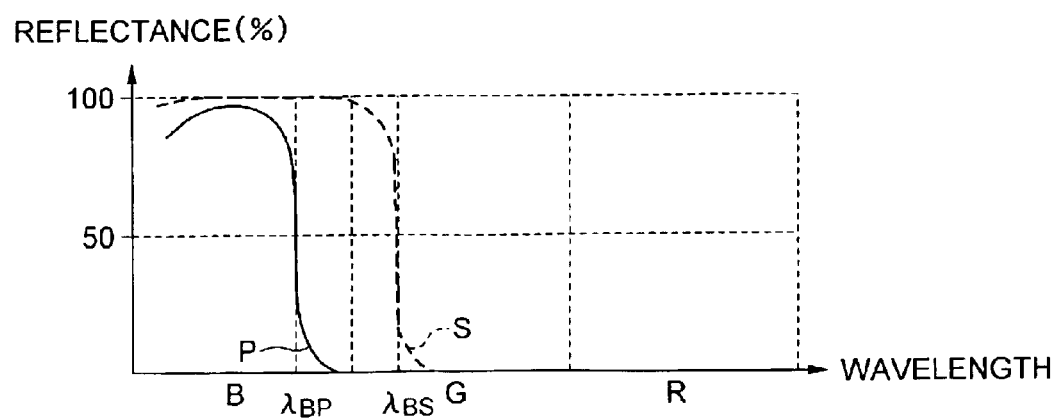

FIGS. 3A and 3B show polarization direction dependency of reflection characteristics of the cross dichroic prism. FIG. 3A shows reflection characteristics of the R light reflective dichroic film 111R, and FIG. 3B shows reflection characteristics of the B light reflective dichroic film 111B. It is inevitable that the reflection characteristics vary depending on the polarization directions (i.e. depending on whether the polarization is P-polarization or S-polarization). More specifically, in the reflection characteristics of the R light reflective dichroic film 111R shown in FIG. 3A, the reflection/transmission boundary wavelength $\lambda RS$ for the R light that is reflected as an S-polarized light by the R light reflective dichroic film 111R and the reflection/transmission boundary wavelength $\lambda RP$ for the R light that is reflected as a P-polarized light by the R light reflective dichroic film 111R are different from each other, and the boundary wavelength for S-polarized light is shorter than the boundary wavelength for P-polarized light. As described before, the R light that has been once reflected as an S-polarized light by the R light reflective dichroic film 111R is reflected and returned by a surface(s) of a lens member(s) of the projection optical system and incident on the cross dichroic prism 111 again as a P-polarized light, in accordance with the above-described travel path. Therefore, such a light component that has a wavelength smaller than the reflection/transmission boundary wavelength $\lambda RP$ for P-polarized light is transmitted, in substance, by the R light reflective dichroic film 111R . The light thus transmitted enters the polarizing beam splitter 107G for G light with its P-polarized state preserved. Furthermore, a light component that has not been modulated by the light valve 108G for G light enters the cross dichroic prism 111 again as a P-polarized light and transmitted by the R light reflective dichroic film 111R and the B light reflective dichroic film 111B to travel further, so that it will be projected as a ghost light. The traveling path of the light that emerges form the light valve 108 and eventually becomes a ghost light is shown in FIG. 15 by the broken line.

Next, in the following, a description will be made of a ghost produced by B light. A modulated light (i.e. P-polarized light) included in the B light emergent from the light valve 108B for B light is incident on the polarizing beam splitter 107B, transmitted by its polarizing splitting surface, and emergent from that polarizing beam splitter. That light is then converted into an S-polarized light by the half wave phase plate 109 and incident on the cross dichroic prism 111. The S-polarized light incident on the cross dichroic prism is reflected by a B light reflective dichroic film 111B in the cross dichroic prism and emergent from it, and converted by the quarter wave phase plate 112 into a circularly polarized light and incident on the projection optical system 113. Such a portion of the B light incident on the projection optical system that has been reflected by a surface(s) of a lens member(s) constituting the projection optical system is returned to the quarter wave phase plate 112 and transmitted by it, whereby the reflected B light is converted into a P-polarized light. That light is then incident on the dichroic prism 111 again. In the reflection characteristics of the B light reflective dichroic film 111B shown in FIG. 3B, the reflection/transmission boundary wavelength $\lambda BS$ for the B light that is reflected as an S-polarized light by the B light reflective dichroic film 111B and the reflection/transmission boundary wavelength $\lambda BP$ for the B light that is reflected as a P-polarized light by the B light reflective dichroic film 111B are different from each other, and the boundary wavelength for P-polarized light is shorter than the boundary wavelength for S-polarized light.

As described before, the B light that has been once reflected as an S-polarized light by the B light reflective dichroic film 111B is reflected and returned by the projection optical system and incident on the cross dichroic prism 111 again as a P-polarized light, in accordance with the above-described travel path. Therefore, the light component that has a wavelength larger than the reflection/transmission boundary wavelength $\lambda BP$ for P-polarized light shown in FIG. 3B is transmitted, in substance, by the B light reflective dichroic film 111B. The light thus transmitted enters the polarizing beam splitter 107G for G light with its P-polarized state preserved. Furthermore, a light component that has not been modulated by the light valve 108G for G light enters the cross dichroic prism 111 again as a P-polarized light and transmitted by the R light reflective dichroic film 111R and the B light reflective dichroic film 111B to travel further, so that it will be projected as a ghost light eventually.

Furthermore, the inventor found that the G light can also be a ghost light. A modulated light (i.e. P-polarized light) included in the G light emergent from the light valve 108G for G light is incident on the polarizing beam splitter 107G, transmitted by its polarizing splitting surface, emergent from that polarizing beam splitter, and incident on a dichroic prism 111. The P-polarized light incident on the dichroic prism 111 is transmitted by the R light reflective dichroic film 111R and the B light reflective dichroic film 111B and emergent from the dichroic prism 111. The p-polarized light is then incident on the quarter wave phase plate 112 so as to be converted into a circularly polarized light and incident on the projection optical system 113. Such a portion of the G light incident on the projection optical system that has been reflected by a surface(s) of a lens member(s) constituting the projection optical system is returned to the quarter wave phase plate 112 and transmitted by it, whereby the reflected B light is converted into an S-polarized light. That light is then incident on the dichroic prism 111 again.

In the reflection characteristics of the R light reflective dichroic film 111R and the B light reflective dichroic film 111B shown in FIGS. 3A and 3B, the reflection/transmission boundary wavelength for the G light that is transmitted as a P-polarized light by the R light reflective dichroic films 111R and the B light reflective dichroic film 111B and the reflection/transmission boundary wavelength for the G light that is transmitted as a P-polarized light by the R light reflective dichroic film 111R and the B light reflective dichroic films 111B are different from each other, and the transmitted wavelength range for S-polarized light is narrower than the transmitted wavelength range for P-polarized light. As described before, the G light that has been once transmitted as a P-polarized light by the R light reflective dichroic film 111R and the B light reflective dichroic film 111B is reflected and returned by a lens member(s) of the projection optical system, then incident on the cross dichroic prism 111 again to enter the dichroic films 111R and 111B for reflecting R light and B light as an S-polarized light, in accordance with the above-described travel path. Therefore, when the G light is incident on the R light reflective dichroic film 111R and the B light reflective dichroic film 111B as an S-polarized light, such a long wavelength component in the G light that has a wavelength larger than the reflection/transmission boundary wavelength for S-polarized light of the R light reflective dichroic film 111R shown in FIG. 3A is reflected, in substance, by the R light reflective dichroic film 111R. The light thus reflected passes through the half wave phase plate 110 so as to be converted into a P-polarized light and enters the polarizing beam splitter 107R for R light. Furthermore, a light component that has not been modulated by the light valve 108R for R light returns as a P-polarized light and enters the half wave phase plate 110 again so as to be converted into S-polarized light and enters the cross dichroic prism 111 again as a S-polarized light and reflected by the R light reflective dichroic film 111R to travel further, so that it will be projected as a ghost light eventually.

On the other hand, when the G light enters the dichroic films 111R and 111B for reflecting R light and B light as an S-polarized light, such a short wavelength component in the G light that has a wavelength smaller than the reflection/transmission boundary wavelength for S-polarized light of the B light reflective dichroic film 111B shown in FIG. 3B is reflected, in substance, by the B light reflective dichroic film 111B. The light thus reflected passes through the half wave phase plate 109 so as to be converted into a P-polarized light and enters the polarizing beam splitter 107B for B light. Furthermore, a light component that has not been modulated by the light valve 108B for B light returns as a P-polarized light and enters the half wave phase plate 109 again so as to be converted into S-polarized light and enters the cross dichroic prism 111 again as a S-polarized light and reflected by the B light reflective dichroic film 111B to travel further, so that it will be projected as a ghost light eventually.

First Embodiment

In a first embodiment of the present invention, a dichroic mirror having a dichroic film formed on its surface is provided between a cross dichroic prism and a polarizing beam splitter, in order to solve the problems elucidated as above.

Figure 1:
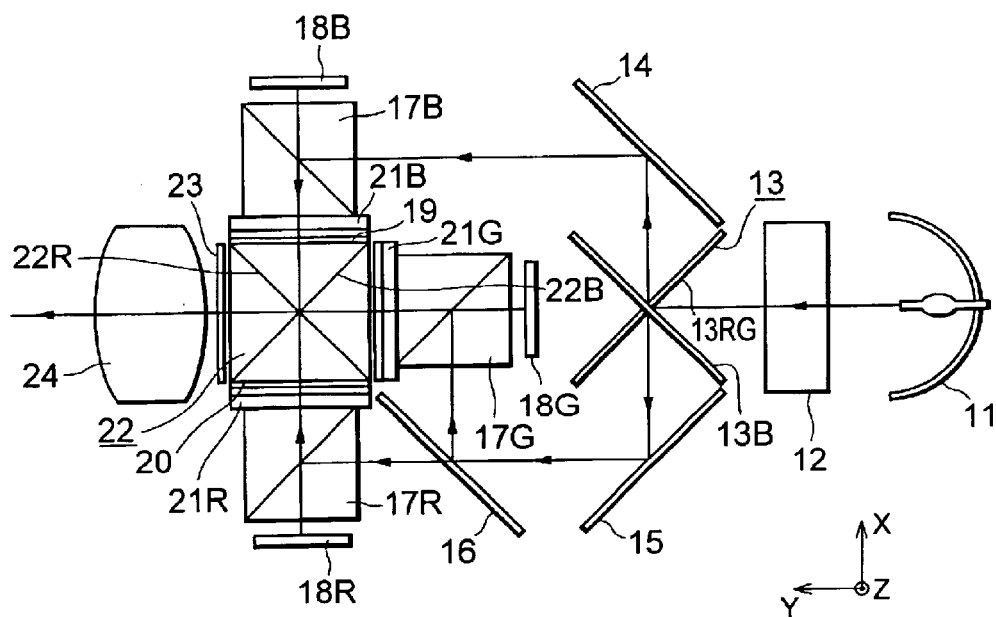
FIG. 1 is a diagram illustrating a projection display apparatus as a first embodiment of the present invention.

FIG. 1 is a diagram showing the overall structure of a projection display apparatus according to the first embodiment of the present invention. In connection with this structure, X-axis, Y-axis and Z-axis that are orthogonal to each other are defined in the manner shown in FIG. 1. It should be noted that Z-axis is taken in the direction perpendicular to the plane of the drawing sheet.

Source light emitted from a light source 11 composed of a lamp and a concave mirror comprises a substantially parallel light flux of randomly polarized light. The source light is incident on a polarization-converting device 12 so as to be converted into an S-polarized light in which the direction of oscillation of the electric vector (which will be hereinafter referred to as the polarization direction) is perpendicular to the plane of the drawing sheet. The light further travels and enters a cross dichroic mirror 13 in which a dichroic mirror 13B having a property of reflecting B (i.e. blue) light and a dichroic mirror 13RG having a property of reflecting R (i.e. red) and G (i.e. green) light are arranged orthogonal to each other to form an X-shape. The light incident on the dichroic mirror 13 is color-separated into a B light and a mixed light including R light and G light, which travel toward directions opposite to each other.

The B light thus color-separated is reflected by a deflecting mirror 14 to change its direction of travel and incident on a polarizing beam splitter 17B provided for the B light. On the other hand, the separated mixed light including R light and G light is reflected by a deflecting mirror 15 to change its direction of travel to enter a dichroic mirror 16 that has a property of reflecting G light so as to be color-separated into a G light that is reflected for further traveling and a R light that is transmitted for further traveling. The R light and the G light thus color-separated are incident on a polarizing beam splitter 17R and a polarizing beam splitter 17G respectively provided for the respective colors. The polarizing splitting surfaces of the polarizing beam splitters 17R and 17G are arranged perpendicularly to the X-Y plane. The lights of the respective colors incident on light valves 18R, 18G and 18B for respective colors are reflected by the light valves 18R, 18G and 18B while modulated by respective color signals. Thus the light of the respective colors emerge from the light valves 18R, 18B and 18G for the respective colors as mixed lights each of which includes a P-polarized light as a modulated light and an S-polarized light as a non-polarized light and enter the polarizing beam splitters 17R, 17G and 17B for the respective colors, whereby only the modulated lights (i.e. P-polarized lights) that are transmitted by the respective polarizing splitting surfaces are analyzed to be picked up. The non-modulated lights (i.e. S-polarized lights) are reflected by the respective polarizing splitting surfaces and thrown away in the directions toward the light source.

Among the analyzed lights of respective colors, the R light and B light are transmitted respectively by dichroic mirrors 21R and 21B having dichroic films formed on them. Each of the dichroic mirrors 21R and 21B is arranged obliquely to the corresponding optical axis at a predetermined angle. Then the R light and B light pass through half wave phase plates 20 and 19 respectively so as to be converted into S-polarized lights and enter a cross dichroic prism 22 from different incidence surfaces opposite to each other respectively. The dichroic mirror 21R has optical characteristics shown in FIG. 4A, and it transmits the R light component without any problem. In addition, the dichroic mirror 21B has optical characteristics shown in FIG. 4B, and it transmits the B light component without any problem.

Figure 4A:
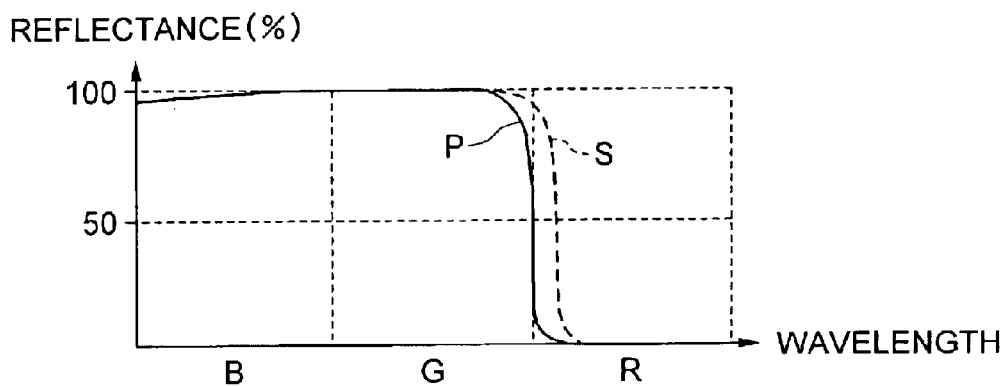
FIGS. 4A, 4B and 4C are graphs showing optical characteristics of dichroic mirrors used in projection display apparatus according to the first to fourth embodiments of the present invention.
Figure 4B:
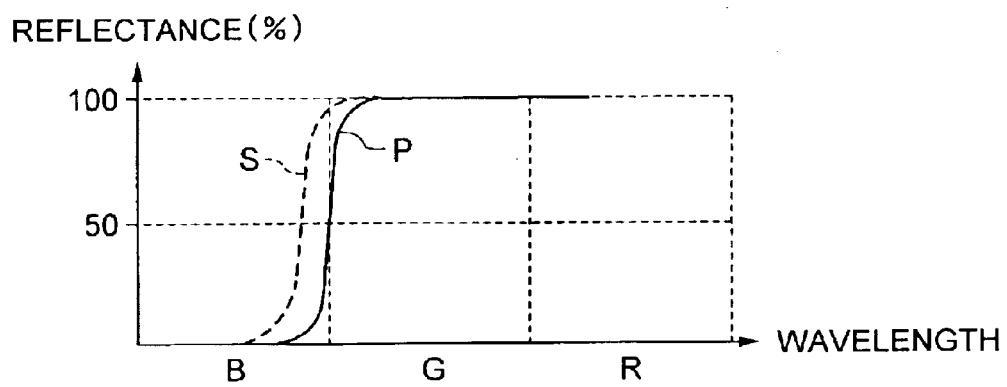
Figure 4C:
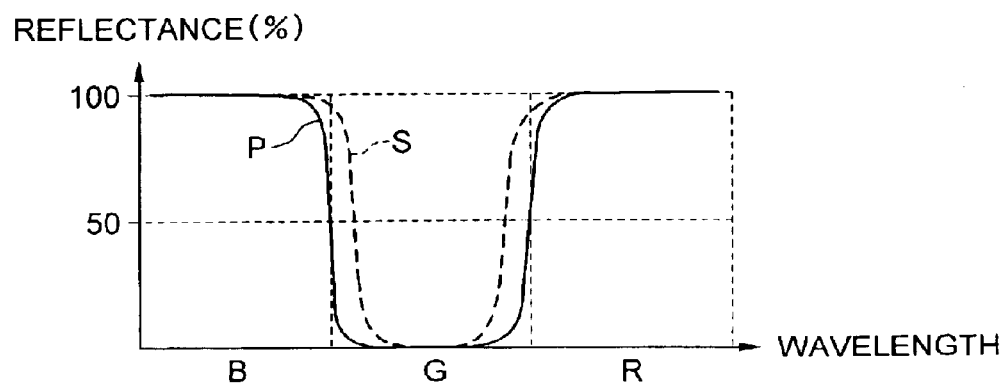

On the other hand, the G light among the above-mentioned analyzed lights is transmitted by a dichroic mirror 21G having a dichroic film formed on it and then the G light enters the cross dichroic prism 22 with its P-polarized state preserved. The dichroic mirror 21G is arranged obliquely to the optical axis at a predetermined angle in a manner similar to the dichroic mirrors 21B and 21R. The dichroic mirror 21G has optical characteristics shown in FIG. 4C, and it transmits the G light component without any problem. In FIGS. 4A to 4C, the solid curves indicate the characteristics for P-polarized light and the broken lines indicate the characteristics for S-polarized light.

The cross dichroic prism 22 that constitutes a color composing optical system includes a dichroic film 22R having a property of reflecting R light and a dichroic film 22B having a property of reflecting B light that are arranged orthogonal to each other to form an X-shape and each of which is arranged orthogonal to X-Y plane, in a manner similar to the dichroic prism of the conventional arrangement. In addition, the dichroic film 22R and the dichroic film 22B have characteristics the same as the characteristics of the cross dichroic films 111R and 111B shown in FIGS. 3A and 3B mentioned in the description of a related art.

The S-polarized B light incident on the cross dichroic prism 22 is reflected in substance by the B light reflective dichroic film 22B, the S-polarized R light incident on that prism is reflected in substance by the R light reflective dichroic film 22R, and the P-polarized G light incident on that prism is transmitted in substance by the B light reflective dichroic film 22B and the R light reflective dichroic film 22R, so that color composition or color synthesis of the B light, R light and G light is attained and those lights are emitted from the cross dichroic prism 22a as a composite light. The composite light emergent from the cross dichroic prism 22 passes through a quarter wave phase plate 23 that is arranged in such a way that its optic axis forms an angle of 45 degree with the direction of oscillation of each of the S-polarized R light, S-polarized B light and P-polarized G light. Thus, each color light is converted into a circularly polarized light to travel further and projected onto a screen (not shown) by means of a projection optical system 24.

Figure 2:
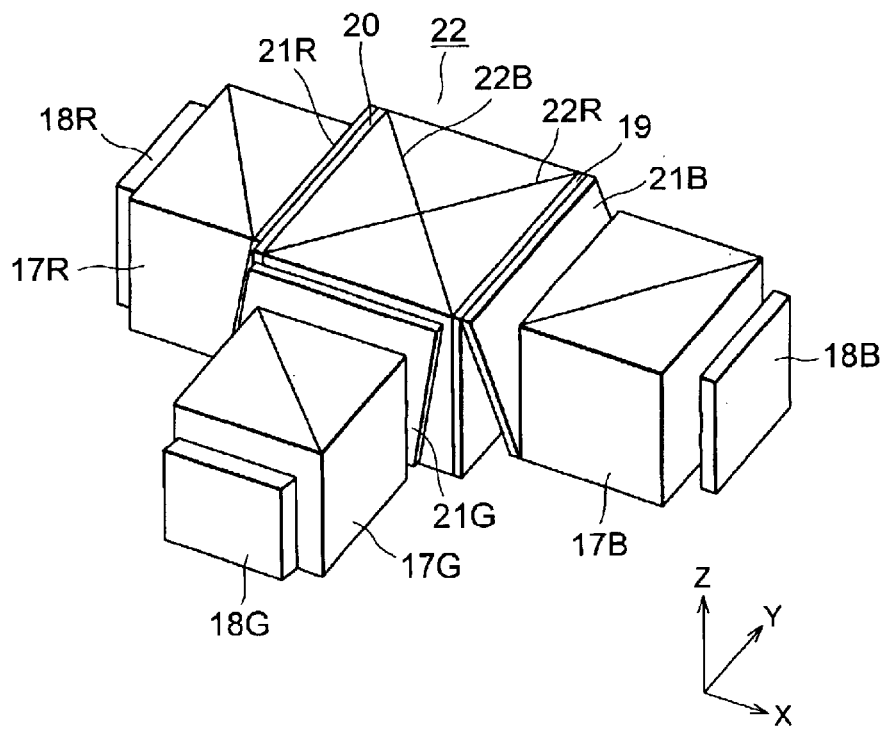
FIG. 2 is a perspective view illustrating a principal portion of the projection display apparatus according to the first embodiment of the present invention.

FIG. 2 is a perspective view illustrating the three dimensional arrangement of the polarizing beam splitters 17R, 17G and 17B for the respective colors, the light valves 18R, 18G and 18B, the cross dichroic prism 22, the dichroic mirrors 21R, 21G and 21B and the half wave phase plates 19 and 20.

As explained under "Investigation on Causes of Ghost light", a portion of the circularly polarized composite light incident on the projection optical system 24 is reflected by a surface(s) of a lens member(s) that constitutes the projection optical system 24 and returned to travel further. Then, the returned light passes through the quarter wave phase plate 23, so that an R light ghost component and a B light ghost component are converted into P-polarized lights and a G light ghost component is converted into an S-polarized light. These lights enters the cross dichroic prism 22 as a composite light from the above-mentioned emergence surface.

A portion of the P-polarized R light component incident on the cross dichroic prism 22 from the reverse direction is transmitted by the R light reflective dichroic film 22R in the cross dichroic prism in accordance with its optical characteristics shown in FIG. 3A. An R light ghost component as the transmitted portion of the R light passes through (or be transmitted by) the two cross dichroic films 22R and 22B and enters the optical path of the G light. However, it is reflected by the dichroic mirror 21G having the optical characteristics shown in FIG. 4C disposed between the cross dichroic prism 22 and the polarizing beam splitter 17G for G light. Since this dichroic mirror is arranged, as described before, obliquely to the optical axis at a predetermined angle, the light reflected by the dichroic mirror is thrown away out of the optical path.

A portion of the P-polarized B light component incident on the cross dichroic prism 22 from the reverse direction is transmitted by the B light reflective dichroic film 22B in the cross dichroic prism in accordance with its optical characteristics shown in FIG. 3B. A B light ghost component as the transmitted portion of the B light also passes through (or be transmitted by) the two cross dichroic films 22R and 22B and enters the optical path of the G light. However, it is reflected by the dichroic mirror 21G having the optical characteristics shown in FIG. 4C disposed between the cross dichroic prism 22 and is thrown away out of the optical path in a manner similar to the above-described R light ghost component.

A portion of the S-polarized G light component incident on the cross dichroic prism 22 from the reverse direction is reflected by the R light reflective dichroic film 22R in the cross dichroic prism in accordance with its optical characteristics shown in FIG. 3A. A G light ghost component as the reflected portion of the G light, which is an S-polarized light, enters the optical path of the R light and passes through the half wave phase plate 20 so as to be converted into a P-polarized light. This light is reflected by the dichroic mirror 21R having the optical characteristics shown in FIG. 4A which is disposed between the half wave phase plate 20 and the polarizing beam splitter 17R for R light and arranged obliquely to the optical axis at a predetermined angle in a manner similar to the dichroic mirror 21G, so that the light is thrown away out of the optical path. Another portion of the S-polarized G light component incident on the cross dichroic prism 22 from the reverse direction is reflected by the B light reflective dichroic film 22B in the cross dichroic prism in accordance with its optical characteristics shown in FIG. 3B. A G light ghost component as another reflected portion of the G light, which is an S-polarized light, enters the optical path of the B light and passes through the half wave phase plate 19 so as to be converted into a P-polarized light. This light is reflected by the dichroic mirror 21B having the optical characteristics shown in FIG. 4B which is disposed between the half wave phase plate 19 and the polarizing beam splitter 17B for B light and arranged obliquely to the optical axis at a predetermined angle in a manner similar to the dichroic mirrors 21R and 21G, so that the light is thrown away out of the optical path.

As described above, in this embodiment, among the lights that have been reflected by a surface(s) of a lens member(s) constituting the projection optical system 24 and returned in the reverse direction along the optical path, an R light component and a B light component that are transmitted by the two dichroic films 22R and 22B of the cross dichroic prism 22 due to the polarization dependency of the optical characteristics of the two dichroic films 22R and 22B of the cross dichroic prism 22 and a G light component that is reflected by either one of the above-mentioned two dichroic mirrors, which light components can possibly be reflected by the light valves for the respective color lights and enter the projection optical system again to become ghost lights, will all be thrown away, in substance, out of the optical paths by the dichroic mirrors 21R, 21B and 21G. Therefore, these light components do not actually enter the projection optical system again nor become ghost lights.

In addition, as described in connection with the conventional arrangement, among the lights that have been reflected by a surface(s) of a lens member(s) constituting the projection optical system 24 and returned in the reverse direction along the optical path, a G light component that is transmitted by the two dichroic films 22R and 22B of the cross dichroic prism 22 and a B light component and R light component that are reflected by either one of the two dichroic films will all be thrown away out of the optical paths. Therefore, in this embodiment, the lights that have been reflected by a surface(s) of a lens member(s) constituting the projection optical system 24 and returned in the reverse direction along the optical path are all thrown away, in substance, out of the optical paths and no ghost light is generated.

Second Embodiment

The second embodiment of the present invention have a structure the same as the structure of the projection display apparatus according to the first embodiment shown in FIG. 1 except that the apparatus according to the second embodiment does not have the dichroic mirrors 21B and 21R shown in FIG. 1 and has only the dichroic mirror 21G.

Figure 5A:
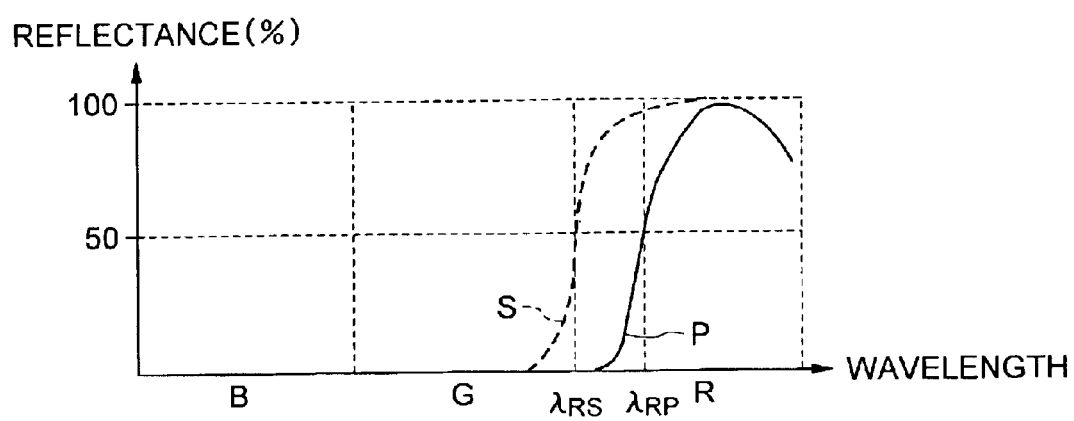
FIGS. 5A and 5B are graphs showing optical characteristics of two dichroic films respectively within a cross dichroic prism that serves as a color composing optical system in the projection display apparatus according to the second embodiment of the present invention.
Figure 5B:
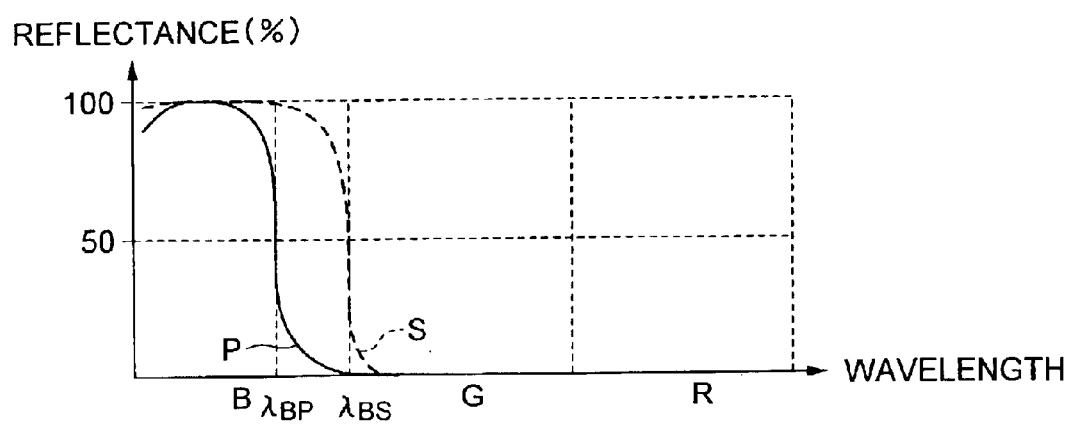

In this embodiment, the optical characteristics of the dichroic film 22R and the dichroic film 22B in the cross dichroic prism 22 are difference from the optical characteristics of the corresponding dichroic films in the first embodiment. The optical characteristics of the dichroic films in the second embodiment are shown in FIGS. 5A and 5B. FIG. 5A shows the optical characteristics of the dichroic film 22R, and FIG. 5B shows the optical characteristics of the dichroic film 22B. The dichroic film 22R has a reflection/transmission boundary for S-polarized light at wavelength λRS indicated in FIG. 5A, and therefore it reflects an S-polarized R light in substance. However, as to P-polarized light, the dichroic film 22R has a reflection/transmission boundary for P-polarized light at wavelength A RP indicated in FIG. 5A, and therefore it transmits a relatively short wavelength part of a P-polarized-R light. The dichroic film 22R substantially transmits B light and G light irrespective of whether the B light and G light are S-polarized or P-polarized. The dichroic film 22B has a reflection/transmission boundary for S-polarized light at wavelength A BS indicated in FIG. 5B, and therefore it reflects an S-polarized R light in substance. However, as to P-polarized light, the dichroic film 22B has a reflection/transmission boundary for P-polarized light at wavelength λBP indicated in FIG. 5B, and therefore it transmits a relatively long wavelength part of a P-polarized B light. The dichroic film 22B substantially transmits R light and G light irrespective of whether the R light and G light are S-polarized or P-polarized.

In the case in which a dichroic film 22R and a dichroic film 22B having the above-mentioned characteristics are used in a color composing optical system, among the components of the above-mentioned composite light (including P-polarized R and B lights and S-polarized G light) as a light that has been reflected by a lens member(s) constituting the projection optical system and passed through the quarter wave phase plate 23, which can possibly be a cause of ghost light, the G light is substantially transmitted by the two dichroic films and then incident on the polarizing beam splitter 17G, so that the G light is reflected out of the optical path and thrown away. Since substantially all of the G light component is transmitted by the dichroic films of the cross dichroic prism in accordance with the optical characteristics shown in FIGS. 5A and 5B, there is no ghost light component that is reflected by either one of the two dichroic films 22R and 22B of the cross dichroic prism 22, incident on the optical path of the B light or R light, reflected by the light valves 18B and 18R for B or R light, and projected.

On the other hand, the R light component and the B light component are partly transmitted by the dichroic mirrors 22R and 22B to enter the optical path of the G light in accordance with the optical characteristics for P-polarized light shown in FIGS. 5A and 5B respectively and enter the optical path of the G light. This light is incident on the dichroic mirror 21G and reflected in substance by that mirror in accordance with its optical characteristics shown in FIG. 4C so as to be thrown away out of the optical path. Other portions of the R light and B light that are reflected by the dichroic film 22R or 22B enter and pass through the half wave phase plate 20 or 19 respectively so as to be converted into S-polarized lights. Then, these lights enter the polarizing beam splitters 17R and 17B, and the lights are reflected by the polarizing splitting surfaces of the respective polarizing beam splitters so as to be thrown away out of the optical paths.

As per the above, in this embodiment, the lights that have been reflected by a surface(s) of a lens member(s) constituting the projection optical system 24 and returned in the reverse direction along the optical path are all thrown away, in substance, out of the optical paths and no ghost light is generated.

Third Embodiment

The third embodiment of the present invention have a structure the same as the structure of the projection display apparatus according to the first embodiment shown in FIG. 1 except that the apparatus according to the third embodiment does not have the dichroic mirror 21G shown in FIG. 1 and has only the dichroic mirrors 21R and 21B.

Figure 6A:
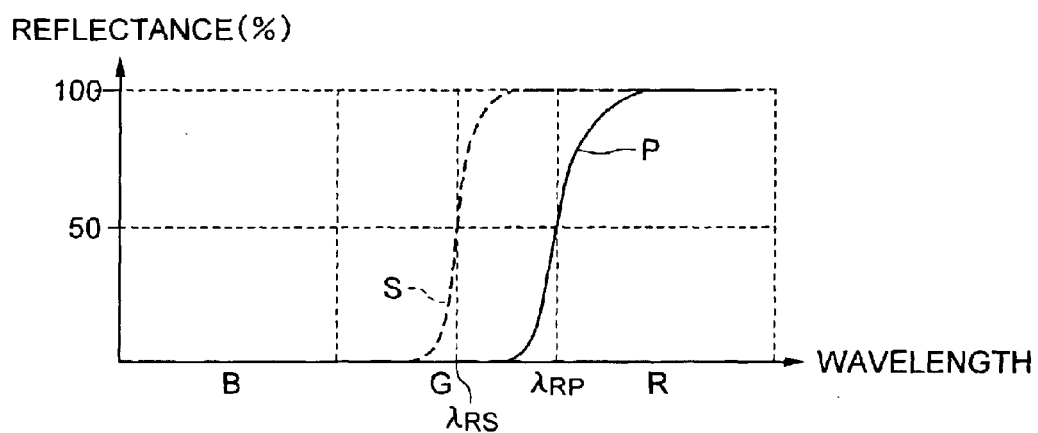
FIGS. 6A and 6B are graphs showing optical characteristics of two dichroic films respectively within a cross dichroic prism that serves as a color composing optical system in the projection display apparatus according to the second embodiment of the present invention.
Figure 6B:
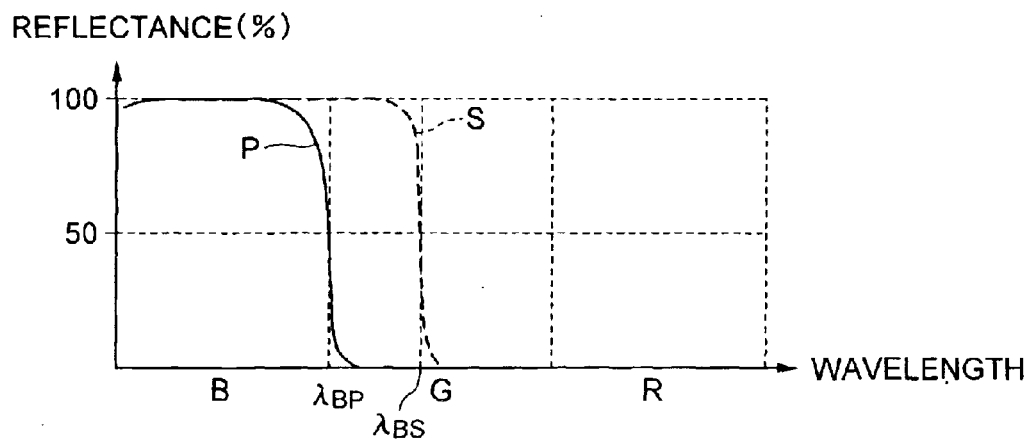

In this embodiment, the dichroic film 22R and the dichroic film 22B in the cross dichroic prism 22 have optical characteristics shown in FIGS. 6A and 6B. FIG. 6A shows the optical characteristics of the dichroic film 22R, and FIG. 6B shows the optical characteristics of the dichroic film 22B. As will be apparent from FIG. 6A, the dichroic film 22R substantially reflects R light irrespective of whether it is S-polarized light or P-polarized light. The dichroic film 22R substantially transmits B light irrespective of whether it is S-polarized light or P-polarized light. As to G light, the dichroic film 22R substantially transmits P-polarized G light, since the reflection/transmission boundary for P-polarized light is at wavelength λ RP in FIG. 6A, but reflects a relatively long wavelength part of S-polarized G light, since the reflection/transmission boundary for S-polarized light is at wavelength λRS in FIG. 6A. As will be apparent from FIG. 6B, the dichroic film 22B substantially reflects B light irrespective of whether it is S-polarized light or P-polarized light. The dichroic film 22B substantially transmits R light irrespective of whether it is S-polarized light or P-polarized light. As to G light, the dichroic film 22B substantially transmits P-polarized G light, since the reflection/transmission boundary for P-polarized light is at wavelength λBP in FIG. 6B, but reflects a relatively short wavelength part of S-polarized G light, since the reflection/transmission boundary for S-polarized light is at wavelength λBS in FIG. 6B.

In the case in which a dichroic film 22R and a dichroic film 22B having the above-mentioned characteristics are used in a color composing optical system, among the lights (P-polarized R and B lights and S-polarized G light) that has been reflected by a lens member(s) constituting the projection optical system, which can possibly be a cause of ghost light, the R light and the B light are reflected in substance by either one of the two dichroic mirrors 22R and 22B and converted into S-polarized light by the half wave phase plate 20 and 19 respectively. The R light and the B light are then incident on the dichroic mirrors 21R and 21B having the optical characteristics shown in FIGS. 4A and 4B, and substantially all of them are transmitted by those mirrors and incident on the polarizing beam splitters 17R and 17B respectively. The lights are reflected by the respective polarizing splitting surfaces so as to be thrown away out of the optical paths, as described in connection with the conventional arrangement. Therefore, they do not become ghost lights. In addition, in accordance with the optical characteristics shown in FIGS. 6A and 6B, substantially all of the above-mentioned R and B light components are reflected by the dichroic films 22R and 22B, and so there is no ghost light component that is transmitted by the dichroic films 22R and 22 B of the cross dichroic prism to enter the optical path of the G light, reflected by the light valve 18G for G light and eventually projected. On the other hand, as to the G light in the reflected light from the projection optical system, a relatively long wavelength part of the G light is reflected by the dichroic film 22R and a relatively short wavelength part of the G light is reflected by the dichroic film 22B in accordance with the optical characteristics shown in FIGS. 6A and 6B respectively. Thus reflected G lights enters the optical path of the R light and the optical path of the B light respectively to reach the dichroic mirrors 21R and 21B so as to be reflected in substance by the dichroic mirrors in accordance with their optical characteristics shown in FIGS. 3A and 3B, so that these G light components are thrown away out of the optical paths. As described in the description of the conventional arrangement, such a portion of the G light that is transmitted by the dichroic films 22R and 22B are incident on the polarizing beam splitter 17G and reflected by its polarizing splitting surface so as to be thrown away out of the optical path.

As per the above, the lights that have been reflected by a surface(s) of a lens member(s) constituting the projection optical system and returned in the reverse direction along the optical path are thrown away out of the optical paths and no ghost light is generated.

In this embodiment, the dichroic mirrors 22R and 22B that have the optical characteristics shown in FIGS. 6A and 6B are used, and the dichroic mirrors 21R and 21B are disposed as well in the optical path of the R light and the optical path of the B light respectively in order to prevent the G light that has been reflected by a surface(s) of a lens member(s) of the projection optical system from becoming a ghost light component via the optical path of the R light and the optical path of the B light. However, since the sensitivity of human eye for color light is highest for red and relatively low for green and blue, a simplified arrangement that prevents only a ghost that is derived from a red light reflected by the projection optical system can realize a significant ghost light preventing effect. Therefore, a structure in which dichroic films 22R and 22B having the optical characteristics shown in FIGS. 6A and 6B are used or a structure in which only a dichroic film having the optical characteristics shown in FIG. 6A is used may also be adopted without the provision of dichroic mirrors 21R and 21B. In such cases, the structure of the apparatus can be simplified, since dichroic mirrors are not required to be provided between a cross dichroic prism and a polarizing beam splitter.

As will be apparent from the description of the first, second and third embodiments, whether or not a dichroic mirror that is disposed obliquely to the optical axis at a certain angle in the optical path between a polarizing beam splitter 17R, 17G or 17B for the respective color lights is to be provided should be independently determined optical path by optical path for the respective color lights in accordance with the optical characteristics of the dichroic films 22R and 22B of a cross dichroic prism 22 for performing color composition, and the arrangement of the dichroic mirrors is not limited to those in the first to third embodiment. In addition, while in the above-described embodiments, the dichroic mirrors 21R, 21G and 21B are arranged in such a way that lights that can possibly be a cause of ghost are thrown away in the "−Z (minus Z)" direction, it is apparent that the direction is not limited to this and the dichroic mirrors may be arranged in other ways, as long as the lights are thrown away out of the optical path.

Fourth Embodiment

In the following, the fourth embodiment of the projection display apparatus according to the present invention will be described with reference to FIGS. 7 and 8. In this embodiment, the functions same as the dichroic mirrors 21R, 21G and 21B in the first to third embodiments are served by dichroic films 428R, 428G and 428B that are formed in the respective polarizing beam splitters in such a way as to be opposed to the polarizing splitting surfaces of the polarizing beam splitters.

Figure 7:
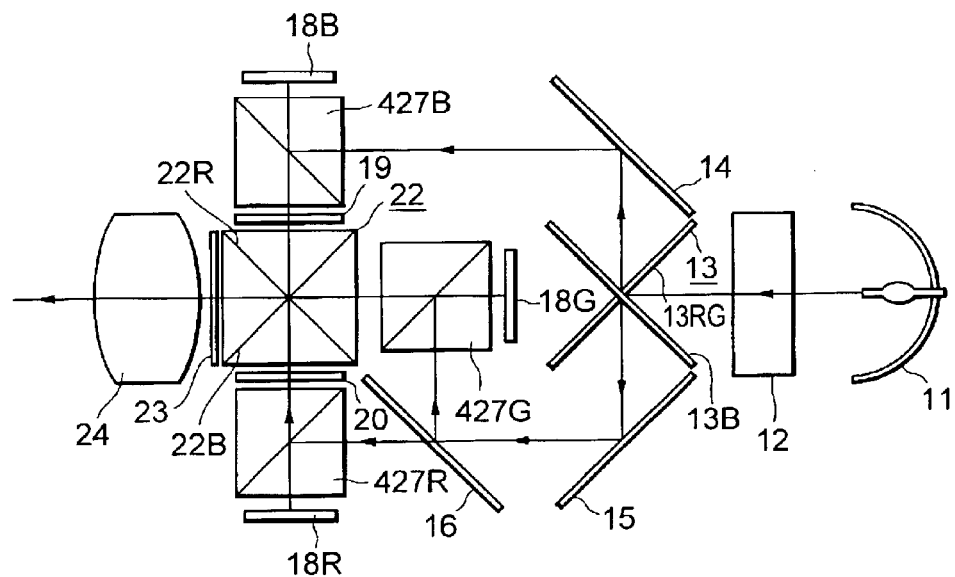
FIG. 7 is a diagram illustrating a projection display apparatus as the fourth embodiment of the present invention.

In FIG. 7, constituent parts of the projection display apparatus that are the same as those in FIG. 1 are designated with the same reference signs and descriptions of their functions that would be redundant will be omitted.

Figure 8:
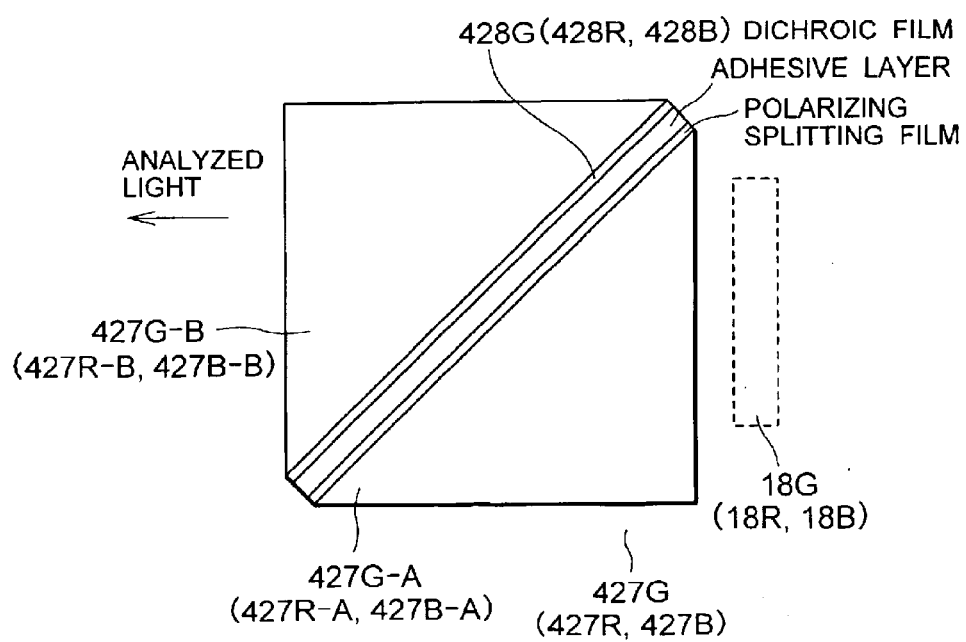
FIG. 8 is a diagram showing a polarizing beam splitter used in the projection display apparatus according to the fourth embodiment of the present invention.

FIG. 8 is a diagram illustrating the structure of the polarizing beam splitters 427R, 427G and 427B used in this embodiment. Each polarizing beam splitters 427R, 427G or 427B used in this embodiment has such a structure in which a polarizing splitting film is formed on the bottom surface of a triangle prism 427G-A, 427R-A or 427B-A, and a dichroic film 428G, 428R or 428B is formed on the bottom surface of a triangle prism 427G-B, 427R-B or 427B-B, and both the films are cemented by an adhesive layer. As shown in FIG. 8, light valves 18G, 18R and 18B for the respective colors are disposed on the side of the prism 427G-A, 427R-A and 427B-A that constitute the polarizing beam splitters. Lights emitted from the light valves 18G, 18R and 18B for the respective colors are first incident on the polarizing splitting films of the polarizing beam splitters so that the respective color lights are analyzed. The transmitted analyzed lights are then transmitted by the dichroic films 428G, 428R and 428B and delivered to a cross dichroic prism 22 for color composition. Therefore, potential ghost light components that have been reflected by the projection optical system 24 and entered into the polarizing beam splitters 427G, 427R and 427B are incident on the dichroic films 428G, 428R and 428B.

In the following, a description will be made in connection with the case in which the dichroic films 22R and 22B of the dichroic prism 22 have the optical characteristics shown in FIGS. 3A and 3B respectively, as described in the description of the first embodiment. The dichroic films 428R, 428B and 428G in the polarizing beam splitters 427R, 427B and 427G have the substantially the same optical characteristics as those shown in FIGS. 4A, 4B and 4C respectively. However, generally, a dichroic film formed on a mirror and a dichroic film formed within a prism are different in their optical characteristics, and the difference between the reflection/transmission boundary wavelength for P-polarized light and the reflection/transmission boundary wavelength for S-polarized light is larger in the dichroic film formed in a prism than in the dichroic film formed on a mirror. Therefore, in the optical characteristics of the dichroic film 428R disposed in the polarizing beam splitter 427R, though the reflection/transmission boundary wavelength for P-polarized light coincides with the boundary of G light and R light as is the case with the dichroic mirror 21R for R light, the reflection/transmission boundary wavelength for S-polarized light of the dichroic film 428R shifts in the longer (or larger) wavelength direction as compared to that of the dichroic mirror 21R. In addition, in the optical characteristics of the dichroic film 428B disposed in the polarizing beam splitter 427B, though the reflection/transmission boundary wavelength for P-polarized light coincides with the boundary of B light and G light, the reflection/transmission boundary wavelength for S-polarized light of the dichroic film 428B shifts in the shorter (or smaller) wavelength direction as compared to that of the dichroic mirror 21B. Similarly, in the optical characteristics of the dichroic film 428G disposed in the polarizing beam splitter 427G, though the shorter reflection/transmission boundary wavelength for P-polarized light coincides with the boundary of B light and G light and the longer reflection/transmission boundary wavelength for P-polarized light coincides with the boundary of G light and R light, the larger reflection/transmission boundary wavelength for S-polarized light of the dichroic film 428G shifts in the longer (or larger) wavelength direction and the shorter reflection transmission boundary wavelength for S-polarized light shifts in the shorter wavelength direction as compared to that of the dichroic mirror 21G. However, these differences do not matter, since the reflection/transmission boundaries are adjusted in such a way as to coincide with the boundaries of the color lights, as described before.

Among the lights that have been reflected by a surface(s) of a lens member(s) constituting the projection optical system 24 to travel in the reverse direction and incident on the cross dichroic prism 22 after passing through the quarter wave phase plate 23, a portion of the P-polarized R and B lights is transmitted by the dichroic films 22R and 22B in accordance with the optical characteristics for P-polarized light of the dichroic films 22R and 22B shown in FIGS. 3A and 3B to enter the optical path of the G light. Then, that light is incident on the dichroic film 428G of the polarizing beam splitter 427G, but the light is reflected in substance by the dichroic film 428G in accordance with its optical characteristics shown in FIG. 5C and thrown away out of the optical path.

On the other hand, portions of the S-polarized G light is reflected by the dichroic films 22R and 22B of the cross dichroic prism 22 in accordance with the optical characteristics for S-polarized light of the dichroic films shown in FIGS. 3A and 3B to enter the optical path of the R light and the optical path of the B light. Then, those lights are incident on the dichroic films 428R and 428B of the polarizing beam splitters 427R and 427B, but the lights are reflected in substance by the dichroic films 428R and 428B in accordance with their optical characteristics shown in FIGS. 5A and 5B and thrown away out of the optical path.

In addition, among the lights that have been reflected by a surface(s) a lens member(s) constituting the projection optical system 24 to travel in the reverse direction and incident on the cross dichroic prism 22 after passing through the quarter wave phase plate 23, the color light components that travel along the optical paths of the corresponding colors in the reverse direction are also thrown away out of the optical path like in the conventional arrangement. Therefore, the light reflected by the projection optical system 24 does not cause a ghost light.

In the case of the second or third embodiment also, the same advantageous effects can be attained, if the functions of the dichroic mirrors are taken over by polarizing beam splitters similar to those used in this fourth embodiment without changing the optical characteristics of the two cross dichroic films and the presence/absence of the dichroic mirrors for the respective colors in the respective embodiment. As per the above, in this embodiment also, the light reflected by a lens member(s) constituting the projection optical system to travel in the reverse direction are thrown away out of the optical paths and if the dichroic films 428G, 428R and 428B are appropriately arranged within the polarizing bean splitters 427G, 427R and 427B. Therefore, that light is not projected as a ghost light.

Fifth Embodiment

Figure 9:
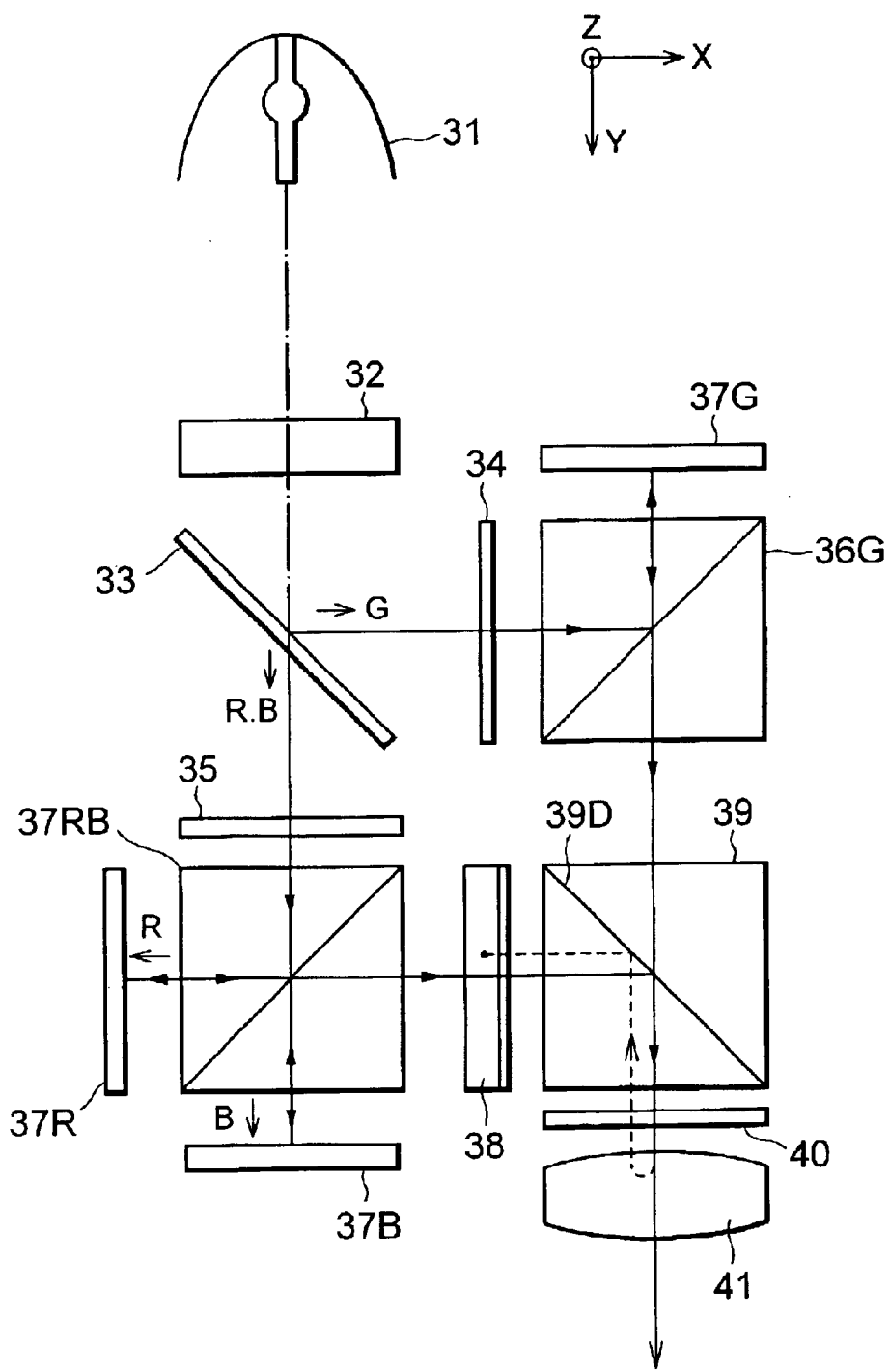
FIG. 9 is a diagram illustrating a projection display apparatus as a fifth embodiment of the present invention.

FIG. 9 is a diagram showing the overall structure of the projection display apparatus according to the fifth embodiment of the present invention. In connection with this structure, X-axis, Y-axis and Z-axis that are orthogonal to each other are defined in the manner shown in FIG. 9. Source light as a substantially parallel light flux emitted from a light source 31 is converted by a polarization-converting device 32 into a P-polarized light having the oscillation direction parallel to X-axis. The P-polarized source light is color-separated by a dichroic mirror 33 into a G light that is reflected by the dichroic mirror and a composite light of R and B that is transmitted by the dichroic mirror. The G light thus separated passes through a half wave phase plate 34 so as to be converted into an S-polarized light that oscillates in the direction parallel to Z-axis that is perpendicular to the plane of the drawing sheet and enters a polarizing beam splitter 36G. The G light is reflected by the polarizing splitting surface of the polarizing beam splitter and then incident on a reflective light valve 37G, in which the G light is modulated by a color signal and reflected. Then the G light emergent from the light valve 37 is analyzed by the polarizing beam splitter 36G. In this embodiment, the modulated light of the light valve 37G for G light is a P-polarized light.

The above-mentioned mixed or composite light of R light and B light passes through a polarization rotating element 35 for changing only the oscillation direction of the R light into the direction of Z-axis to convert the R light into an S-polarized light. Thus the R light is converted into an S-polarized, while the B light preserves its P-polarized state. Then, the mixed light is incident on a polarizing beam splitter 36RB so as to be color-separated into an R light that is reflected by the polarizing splitting surface and a B light.

The R light and the B light having been color-separated as above enter reflective light valves 37R and 37B provided for the respective color. Each color light incident on the light valve 37R or 37B for the corresponding color is modulated by a color signal and reflected by the light valve. In this embodiment, the modulated light of the light valve 37R for R light and the modulated light of the light valve 37G for G light are P-polarized lights, and each of the light valves 37R and 37G emits a mixed light including a P-polarized light as the modulated light and an S-polarized light as a non-modulated light. On the other hand, the light valve 37B for B light emits a mixed light including an S-polarized light as the modulated light and a P-polarized light as the non-modulated light. The modulated light emergent from the light valve 37B for B light and the modulated light emergent from the light valve 37R for R light are incident on the polarizing beam splitter 36RB from different surfaces, and the B light is reflected by the polarizing splitting surface and the R light is transmitted by the polarizing splitting surfaces, so that both the lights are analyzed.

Figure 12:
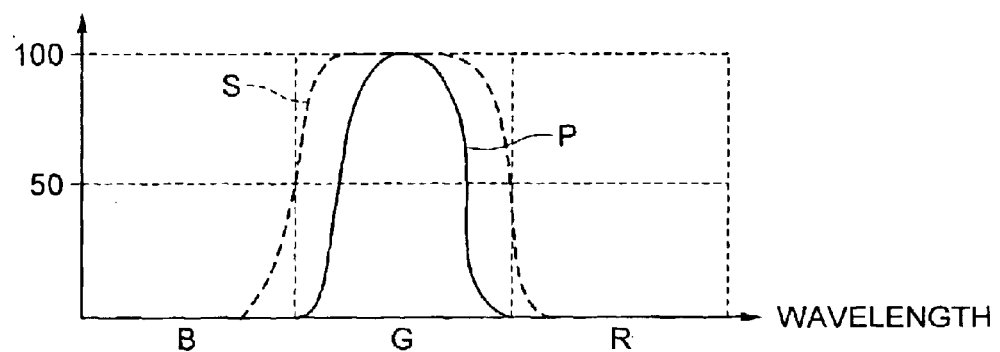
FIG. 12 is a graph showing optical characteristics of a dichroic mirror used in the projection display apparatus according to the fifth embodiment of the present invention.

On the other hand, the analyzed light of the G light is incident on a dichroic prism 39 for performing color composition. The analyzed lights of the R and B lights are incident on a dichroic mirror 38 having a dichroic film formed on its surface and transmitted by the dichroic mirror 38 that has optical characteristics shown in FIG. 12 to travel further and incident on the dichroic prism 39. Characteristics of the dichroic mirror 38 will be described later. The dichroic mirror 38 is disposed obliquely to the optical axis at a predetermined angle.

The dichroic prism 39 for performing color composition has a dichroic film 39D within it. Optical characteristics of the dichroic film 39D are shown in FIG. 10.

Figure 10:
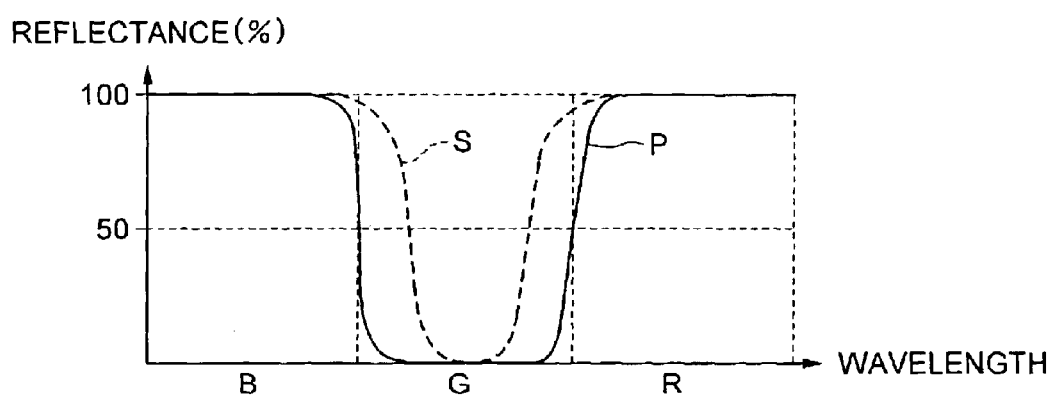
FIG. 10 is a graph showing optical characteristics of a dichroic film within a dichroic prism that serves as a color composing optical system in the projection display apparatus according to the fifth embodiment of the present invention.

The P-polarized G light incident on the dichroic prism 39 is transmitted by the dichroic film 39D in accordance with its optical characteristics shown in FIG. 10. The P-polarized R light and the S-polarized B light are reflected in substance by the dichroic film 39D, so that these lights are color-composed with the above-mentioned G light to emerge from the dichroic prism 39.

The composite color light of the R, G and B emergent from the dichroic prism 39 passes through a quarter wave phase plate 40 so as to be converted into a circularly polarized light. This light travels further and enters a projection optical system 41 so as to be projected onto a screen (not shown). Among the light components that have been reflected by a surface(s) of a lens member(s) constituting the projection optical system 41 to travel in the reverse direction, the R light and the G light are converted into S-polarized lights and B light is converted into a P-polarized light respectively by the quarter wave length phase plate 40 to travel further, so that these lights enter the dichroic prism 39 again from the reverse direction. Among the lights that have entered the dichroic prism 39 for performing color composition, the S-polarized G light is incident on the dichroic film 39D and a relatively short wavelength part and a relatively long wavelength part of it are reflected by the dichroic film 39D in accordance with the optical characteristics for S-polarized light of the polarizing splitting surface shown in FIG. 10. Thus reflected portions or components of the S-polarized G light are incident on the dichroic mirror 38 and reflected in substance by the dichroic mirror 38 in accordance with its optical characteristics for S-polarized light so as to be thrown away out of the optical path.

If the dichroic mirror 38 were not provided, those components of the G light that have been reflected by the dichroic film 39D would be incident on the polarizing beam splitter 36RB, reflected by its polarizing splitting surface, incident on the light valve 37B for B light, reflected by the light valve 37B, so that a non-modulated light component of the G light would be returned to the projection optical system 41 via the polarizing beam splitter 36RB and the dichroic prism 39 and a G ghost light would be projected.

Figure 11:
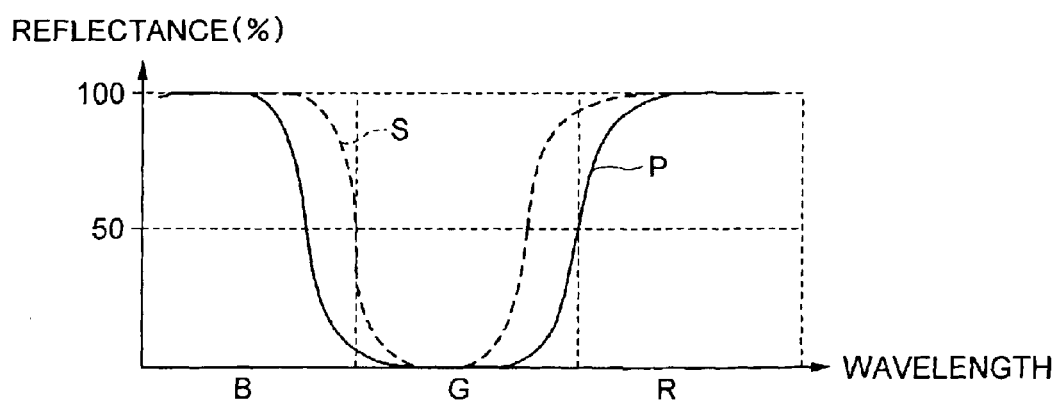
FIG. 11 is a graph showing optical characteristics of an alternative dichroic film within a dichroic prism that serves as a color composing optical system in the projection display apparatus according to the fifth embodiment of the present invention.
Figure 13:
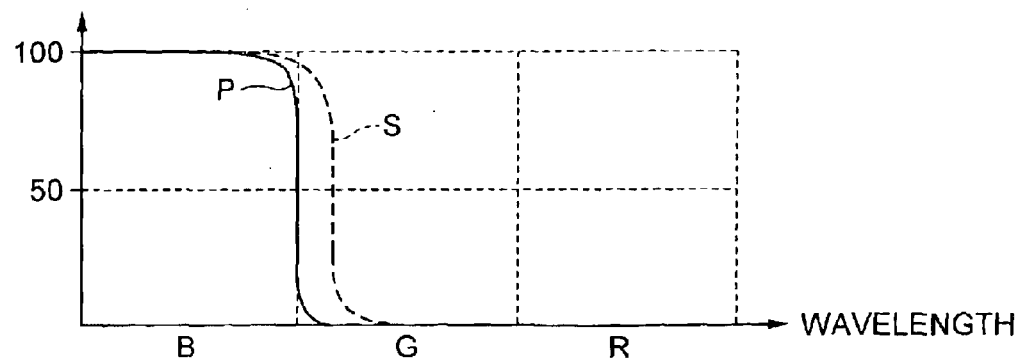
FIG. 13 is a graph showing optical characteristics of another dichroic mirror used in the projection display apparatus according to the fifth embodiment of the present invention.

While the forgoing description has been made in connection with the dichroic prism 39 that has the optical characteristics shown in FIG. 10, there may be a dichroic prism that has optical characteristics shown in FIG. 11. When the dichroic prism 39 having the optical characteristics shown in FIG. 11 is used, among the lights that have been reflected by the projection optical system and returned in the reverse direction to enter the dichroic prism 39 including S-polarized R and G lights and a P-polarized B light, a relatively long wavelength part of the G light will be reflected by the dichroic film 39D and a relatively long wavelength part of the B light will be transmitted by the dichroic film 39D. This reflected part of G light will be reflected by the dichroic mirror 38 and thrown away out of the optical path, but the transmitted part of B light will be reflected by the light valve 37G after passing through the polarizing beam splitter 36G and returned to the projection optical system to become a ghost light. In order to throw away the above-mentioned light that can possibly be a ghost light out of the optical path, a dichroic mirror having optical characteristics shown in FIG. 13 is disposed obliquely to the optical axis in the optical path between the polarizing beam splitter 36G and the dichroic prism 39 so that the above-mentioned B light incident on that mirror would be reflected to be thrown away out of the optical path. Alternatively, it is apparent that instead of providing such a mirror, a dichroic film having the optical characteristics same as those shown in FIG. 11 may be formed within the polarizing beam splitter 36 in such a way as to be opposed to its polarizing splitting surface in a manner shown in FIG. 8 to throw away the B light out of the optical path.

As per the above, the present invention relates to a projection display apparatus in which modulated lights included in lights of respective colors emitted from a plurality of reflective light valves are analyzed to be picked up by polarizing beam splitters provided for the respective colors and composed by a color composing optical system having a dichroic film and the composite light is projected by a projection system, and having a quarter wave phase plate disposed in the optical path between the color composing optical system and the projection optical system. In such an apparatus, a light that has been reflected from a lens member(s) constituting the projection optical system and incident on the color composing optical system again to travel along the optical path in the reverse direction are color-separated by the dichroic film included in the color composing optical system into color components that are different from those in the case of the light traveling in the normal direction due to a difference in the optical characteristics of the dichroic film depending on the polarization direction. Therefore, the separated lights travel along optical paths of other color lights that are different from the respective corresponding color lights, and the lights are transmitted by the light valves for other color lights and incident on the projection optical system again via the color composing optical system, so that the lights are projected as ghost lights. In this invention, dichroic mirrors having predetermined optical characteristics and arranged obliquely to the optical axes are provided in the optical paths between the color composing optical system and the polarizing splitting surfaces of the polarizing beam splitters for the respective colors, so that the above-mentioned light components that can potentially be ghost lights are reflected to be thrown away out of the optical paths. Therefore, the generation of ghost lights can be prevented and it is possible to project images with high image contrast quality.

What is claimed is:

1. A projection display apparatus comprising:

reflective light valves provided for R (red) light, G (green) light and B (blue) light respectively, polarizing beam splitters provided for the respective color lights which analyze to pick up the respective color lights that have been modulated and emitted from said reflective light valves for the respected colors;

a cross dichroic prism on which the analyzed lights emergent from said polarizing beam splitters for the respective color lights are made incident from different surfaces respectively, said cross dichroic prism having an R light reflective dichroic film having a property of reflecting the R light and a B light reflective dichroic film having a property of reflecting the B light that are orthogonal to each other, wherein the R light is reflected by said R light reflective dichroic film, the B light is reflected by said B light reflective dichroic film, and the G light is transmitted by said R light reflective dichroic film and said B light reflective dichroic film, so that the color lights are color-composed and a composed light is emitted from the cross dichroic prism;

a quarter wave phase plate that converts said composite light into a circularly polarized light; and a projection optical system that projects said composite light that have bean converted into the circularly polarized light;

wherein, the R light and the B light that are emergent from said polarizing beam splitters for the respective color lights and incident on paid cross dichroic prism are S-polarized with respect to said R light reflective dichroic film and said B light reflective dichroic film of said cross dichroic prism, and the G light that is emergent from said polarizing beam splitter and incident on said cross dichroic prism is P-polarized with respect to said a light reflective dichroic film and said B light reflective dichroic film, and the apparatus further comprises a dichroic film disposed in at least one of optical paths of the respective color lights between polarizing splitting surfaces of said polarizing bean splitters for the respective color lights and said cross dichroic prism, which reflects such a component of the R light or the B light derived from said composite light incident on said projection optical system that has been reflected by a surface of a lens element constituting said projection optical system and incident on said cross dichroic prism after passing through said quarter wave phase plate and incident on said R light reflective dichroic film and said B light reflective dichroic film and transmitted by said R light reflective dichroic film end said B light reflective dichroic film to travel along the optical path of the G light in the reverse direction, or such a component of the G light derived from said composite light incident on said projection optical system that has been reflected by a surface of a lens element constituting said projection optical system and incident on said cross dichroic prism after pausing through said quarter wave phase plate and reflected by at least one of said two dichroic films to travel along the optical path of said R light or said B light in the reverse direction, so as to deflect said R light component, said B light component or said G light component out of the optical path.

2. A projection display apparatus according to claim 1, the dichroic film provided in at least one of said optical paths of the respective color lights between the polarizing splitting surfaces of said polarizing beam splitters for the respective color lights and said across dichroic prism is disposed in the optical path between said polarizing beam splitter and said cross dichroic prism.

3. A projection display apparatus according to claim 1, wherein the dichroic film provided in at least one of said optical paths of the respective color lights between the polarizing splitting surfaces of said polarizing beam splitters for the respective color lights and said cross dichroic prism is disposed within said polarizing beam splitter in such a way as to be opposed to said polarizing splitting surface.

4. A projection display apparatus comprising:

reflective light valves provided, respectively for a plurality of color lights;

at least two polarizing beam splitters which effect polarization splitting said plurality of color lights at a respective polarizing splitting portions and emitting the polarized splitted lights to said reflective light valves and then analyzing lights emergent from said reflective light valves, a color composing prism into which the analyzed lights are made incident through respectively different surfaces, has inside thereof at least one color composing dichroic film and composes said plurality of color lights and emits a composite light;

a projection lens disposed for projecting light composed through said color composing prism;

a quarter wave phase plate disposed between said color composing prism and said projection lens; and a dichroic film disposed in an optical path of at least one of the respective color lights between said polarizing splitting portions of said polarizing beam splitters for the respective color lights and said color composing prism, the dichroic film reflecting at least one color light of the color lights which are other than said at least one color light and deflecting it out of the optical path.

5. A projection displaying apparatus according to claim 4, wherein said dichroic film reflects color light which, among lights made incident on said projection lens after emitted from said color composing prism and then passing through said quarter wave plate, has passed through or been reflected by said projection lens, has been made incident on said color composing prism, has passed through or been reflected by said color composing prism and then advances in the reverse direction along optical path of other color light.

6. A projection display apparatus according to claim 5, wherein said plurality of color lights are R light, G light, and B light;

said polarizing beam splitters include a G light polarizing beam splitter for G light, and an R light and B light polarizing beam splitter for R light and B light;

said R light and B light are made incident on said R light and B light polarizing beam splitter through a polarization rotation element for rotating the polarizing direction of said R light by 90 degrees; and said dichroic film includes a dichroic film which is disposed in the optical path between the R light and B light polarizing beam splitter and said color composing prism, and which reflects G light which has been made incident, as P- polarized light, on said color composing dichroic film and passed therethrough, then made incident on said projection lens through said quarter wavelength phase plate and reflected thereby while being converted by said quarter wavelength plate to S-polarized light, and then reflected by said color composing dichroic film.

7. A projection display apparatus according to claim 4, wherein said dichroic film reflects color light which advances reversely in an optical path for other color light, said reversely advancing color light, among composite lights, emitted from said color composing prism and having passed through said quarter wave plate and made incident on said projection lens, then passing through said quarter wave plate, then made incident on said color composing prism, then transmitting through or reflected by said dichroic film and advancing in said optical path for other light as described, and deflects it out of the optical path.

8. A projection display apparatus comprising:

reflective light valves provided for R (red) light, G (green) light and B (blue) light, respectively;

polarizing beam splitters provided for polarizing splitting at respective polarizing splitting portions to emit the respective color light, the polarizing beam splitters analyzing at said polarizing splitting portions the lights emitted from said reflective light valves for the respective colors;

a cross dichroic prism on which analyzed lights emergent from said polarizing beam splitters for the respective color lights are made incident from different surfaces respectively, said cross dichroic prism having an R light reflective dichroic film having a property of reflecting the R light and a B light reflective dichroic film having a property of reflecting the B light that are orthogonal to each other, wherein the R light is reflected by said R light reflective dichroic film, the B light is reflected by said B light reflective dichroic film, and the G light is transmitted through said R light reflective dichroic film and said B light reflective dichroic film, so that the color lights are color-composed and a composite light is emitted from the cross dichroic prism;

a projection lens disposed for projecting the composite light emitted from said cross dichroic prism;

a quarter wave phase plate disposed between said cross dichroic prism and said projection lens; and a dichroic film disposed in an optical path of at least one color light of the respective color lights between the polarizing splitting portions of said polarizing beam splitters for the respective color lights and said cross dichroic prism, said dichroic film reflecting at least one color light of the color lights which are other than said at least one color light among said respective color lights and deflects the same out of the optical path.

9. A projection display apparatus according to claim 8, wherein said dichroic film reflects color light which advances reversely in an optical path for other color light, said reversely advancing color light, among composite lights emitted from said cross dichroic prism and having passed through said quarter wavelength phase plate and made incident on said projection lens, having been reflected by said projection lens, then passing through said quarter wavelength phase plate, then made incident on said cross dichroic prism, then transmitting through or reflected by said R light reflective dichroic film or said B light-reflective dichroic film and advancing in said optical path for other light as described.

10. A projection display apparatus according to claim 9, wherein said dichroic film is disposed in an optical path between the polarizing splitting portion of the G light polarizing beam splitter and said cross dichroic prism and reflects R light which has been made incident, as S-polarized light, on said R light reflective dichroic film and reflected thereby, then made incident on said projection lens through said quarter wave phase plate, then reflected by said projection lens, then converted to P-polarized light through said quarter wave phase plate, and then made incident on and passing through said R light reflective dichroic film.

11. A projection display apparatus according to claim 9, wherein a dichroic film is disposed in an optical path between the polarizing splitting portion of the G light polarizing beam splitter and said cross dichroic prism and reflects B light which has been made incident, as S-polarized light, on said B light reflective dichroic film and reflected thereby, then made incident on said projection lens through said quarter wavelength phase plate, then reflected by said projection lens, then converted to P-polarized light by said quarter wavelength phase plate, and then made incident on and passing through said B light reflective dichroic film.

12. A projection display apparatus according to claim 9, wherein said dichroic film is disposed in an optical path between the polarizing splitting portion of the R light polarizing beam splitter and said cross dichroic prism and reflects G light which has been made incident, as P-polarized light, on said R light reflective dichroic film and reflected thereby, then made phase plate, then reflected by said projection lens, then converted to S-polarized light with reflected by said projection lens and then made incident on and reflected by said R light reflective dichroic film.

13. A projection display apparatus according to claim 9, wherein said dichroic film is disposed in an optical path between the polarizing splitting portion of the B light polarizing beam splitter and said cross dichroic prism and reflects G light which has been made incident, as P-polarized light, on said B light reflective dichroic film and reflected thereby, then made incident on said projection lens through said quarter wave phase plate, then reflected by said projection lens, then covered to S-polarized light through said quarter wave phase plate, and then made incident on and reflected by said B light reflective dichroic film.

14. A projection display apparatus according to claim 9, wherein a dichroic film disposed in an optical path for at least one color light among the optical paths for the respective color lights between the polarizing splitting portions of the polarizing beam splitters for the respective color lights and said cross dichroic prism, is disposed in the optical path between the corresponding polarizing beam splitter and said cross dichroic prism.

15. A projection display appratus according to claim 9, wherein R light and B light which are emergent from said polarizing beam splitters and made incident on said cross dichroic prism are S-polarized light for said R light reflective dichroic film and said B light reflective film, and G light is P-polarized light for said R light reflective dichroic film and said B light reflective dichroic film.

16. A projection display apparatus according to claim 9, wherein said R light reflective dichroic film has a boundary wavelength for reflection and transmission at a boundary between the R light and the G light with respect to the P-polarized light.

17. A projection display apparatus according to claim 9, wherein a dichroic film disposed in an optical path of the at least one color light among optical paths of the respective color lights between the polarizing splitting portions of the polarization beam splitters for the respective color lights and said cross dichroic prism, is opposed to said polarizing beam splitting portion of the corresponding polarizing beam splitter.

* * * * *